United States Patent
Watanabe et al.

(10) Patent No.: US 11,388,230 B2
(45) Date of Patent: Jul. 12, 2022

(54) INFORMATION PROCESSING APPARATUS, INFORMATION PROCESSING METHOD, AND PROGRAM

(71) Applicant: Sony Corporation, Tokyo (JP)

(72) Inventors: Kazuhiro Watanabe, Tokyo (JP); Matthew Lawrenson, Bussigny (CH); Christopher Wright, London (GB); Jan Jasper van den Berg, Lausanne (CH)

(73) Assignee: Sony Corporation, Tokyo (JP)

( * ) Notice: Subject to any disclaimer, the term of this patent is extended or adjusted under 35 U.S.C. 154(b) by 9 days.

(21) Appl. No.: 16/652,377

(22) PCT Filed: Sep. 28, 2018

(86) PCT No.: PCT/JP2018/036158
§ 371 (c)(1),
(2) Date: Mar. 30, 2020

(87) PCT Pub. No.: WO2019/111506
PCT Pub. Date: Jun. 13, 2019

(65) Prior Publication Data
US 2020/0296156 A1 Sep. 17, 2020

(30) Foreign Application Priority Data
Dec. 4, 2017 (JP) .............................. JP2017-232510

(51) Int. Cl.
*H04L 67/1074* (2022.01)
*G06F 9/46* (2006.01)
(Continued)

(52) U.S. Cl.
CPC .......... *H04L 67/1082* (2013.01); *G06F 9/466* (2013.01); *G06Q 50/01* (2013.01);
(Continued)

(58) Field of Classification Search
CPC ............... H04L 67/1082; H04L 9/0643; H04L 67/1072; H04L 2209/38; G06F 9/466; G06Q 50/01
(Continued)

(56) References Cited

U.S. PATENT DOCUMENTS 10,580,100 B2 * 3/2020 Pierce ................. H04L 63/0435
10,581,615 B2 * 3/2020 Xie ....................... H04L 9/0637
(Continued)

FOREIGN PATENT DOCUMENTS

WO   WO 2017/170679    10/2017

OTHER PUBLICATIONS

International Preliminary Report on Patentability dated Jun. 18, 2020 in connection with International Application No. PCT/JP2018/036158, and English translation thereof.
(Continued)

*Primary Examiner* — Melvin H Pollack
(74) *Attorney, Agent, or Firm* — Wolf, Greenfield & Sacks, P.C.

(57) ABSTRACT

To more appropriately perform a consensus processing regarding update of a peer-to-peer database.
There is provided an information processing apparatus including: an acquiring unit that acquires a value indicating an influence of a user; and a consensus processing unit that performs consensus processing regarding update of a P2P database on the basis of the value indicating the influence.

16 Claims, 11 Drawing Sheets

(51) Int. Cl.
*G06Q 50/00* (2012.01)
*H04L 9/06* (2006.01)
*H04L 67/1061* (2022.01)

(52) U.S. Cl.
CPC ........ *H04L 9/0643* (2013.01); *H04L 67/1072* (2013.01); *H04L 2209/38* (2013.01)

(58) Field of Classification Search
USPC .......................................................... 709/226
See application file for complete search history.

(56) References Cited

U.S. PATENT DOCUMENTS

| | | | |
|---|---|---|---|
| 10,621,510 B2* | 4/2020 | Saxena | G06F 21/6245 |
| 10,643,288 B2* | 5/2020 | Orsini | H04L 63/12 |
| 10,650,456 B2* | 5/2020 | Al-Masoud | G06F 16/951 |
| 10,681,060 B2* | 6/2020 | Scheidler | G06F 21/566 |
| 10,733,176 B2* | 8/2020 | Cochrane | G06F 16/2365 |
| 10,735,450 B2* | 8/2020 | Smith | G06F 9/466 |
| 10,757,103 B2* | 8/2020 | Irwan | G06F 15/76 |
| 10,785,167 B2* | 9/2020 | Karame | G06F 21/604 |
| 10,810,004 B2* | 10/2020 | Mills | G06F 8/71 |
| 10,839,379 B2* | 11/2020 | Pierce | G06Q 20/08 |
| 10,862,959 B2* | 12/2020 | Finlow-Bates | H04L 67/104 |
| 10,924,264 B2* | 2/2021 | Wilson | H04L 9/30 |
| 11,004,072 B2* | 5/2021 | Georgiadis | H04L 9/3213 |
| 11,030,187 B1* | 6/2021 | Boodman | G06F 16/285 |
| 11,128,607 B2* | 9/2021 | Wright | G06Q 20/3829 |
| 11,130,042 B2* | 9/2021 | Tran | A61B 5/11 |
| 11,159,318 B2* | 10/2021 | Maim | G06Q 20/065 |
| 11,159,537 B2* | 10/2021 | Frederick | H04L 63/12 |
| 2007/0260725 A1 | 11/2007 | McCuller | |
| 2015/0332283 A1 | 11/2015 | Witchey | |
| 2017/0330179 A1 | 11/2017 | Song et al. | |
| 2019/0384748 A1* | 12/2019 | Roennow | G06F 21/64 |
| 2020/0104177 A1* | 4/2020 | Inokuchi | G06F 9/5027 |
| 2020/0279056 A1 | 9/2020 | Takahashi et al. | |
| 2020/0293588 A1 | 9/2020 | Ikenaga et al. | |
| 2020/0294417 A1 | 9/2020 | Takahashi et al. | |
| 2020/0311052 A1 | 10/2020 | Takahashi et al. | |
| 2020/0366479 A1* | 11/2020 | Lee | H04L 9/088 |

OTHER PUBLICATIONS

Extended European Search Report dated May 25, 2020 in connection with European Application No. 18886569.5.
Antonopoulos, Mastering Bitcon. Unlocking Digital Cryptocurrencies. O'Reilly Media, Inc. Dec. 1, 2014 (First release). Mar. 6, 2015 (Second release). 298 pages. ISBN: 978-1-449-37404-4.
Imamura, Analysis and evaluation on block chain technology, Proceedings of FIT 2017. The 16th Forum on Information Technology. The 4th Separate Volume Election Papers. General Papers Network. Security Ubiquitous. Mobile Computing Education. Humanities Information System. Sep. 5, 2017. pp. 103-108.
Shimada, Issue 3, The structure of the block chain learned now. Software Design. Apr. 20, 2017. vol. 385(3). pp. 80-90. 13 pages.
Swan, Blockchain. Blueprint for a New Economy. Jan. 22, 2015. 149 pages. ISBN: 978-1-491-92049-7.
International Search Report and English translation thereof dated Jan. 8, 2019 in connection with International Application No. PCT/JP2018/036158.
Antonopoulos, Mastering Bitcon. Unlocking Digital Cryptocurrencies. O'Reilly. 2015. 298 pages. ISBN: 978-1-449-37404-4.
Imamura, Analysis and evaluation on block chain technology, Proceedings of FIT 2017. The 16th Forum on Information Technology. The 4th Separate Volume Election Papers. General Papers Network. Security Ubiquitous. Mobile Computing Education. Humanities Information System, pp. 103-108.
Shimada, Issue 3, The structure of the block chain learned now. Software Design. 2017. vol. 385. pp. 80-90. 13 pages.
Swan, Blockchain. Blueprint for a New Economy. 2015. 149 pages. ISBN: 978-1-491-92049-7.
International Written Opinion dated Jan. 8, 2019 in connection with International Application No. PCT/JP2018/036158, and English translation thereof.
U.S. Appl. No. 16/652,380, filed Mar. 30, 2020, Ikenaga et al.
U.S. Appl. No. 16/652,382, filed Mar. 30, 2020, Takahashi et al.
U.S. Appl. No. 16/645,100, filed Mar. 6, 2020, Takahashi et al.
U.S. Appl. No. 16/652,374, filed Mar. 30, 2020, Takahashi et al.

* cited by examiner

FIG. 5B

DISTRIBUTION OF IC BY PAPER 5

| DISTRIBUTION TARGET OF IC | NUMBER OF CITATIONS | RATIO OF DISTRIBUTION | DISTRIBUTED IC |
|---|---|---|---|
| PROVISION USER OF PAPER 1 | 4 | 4/23 | 0.17 |
| PROVISION USER OF PAPER 2 | 17 | 17/23 | 0.74 |
| PROVISION USER OF PAPER 3 | 1 | 1/23 | 0.04 |
| PROVISION USER OF PAPER 4 | 1 | 1/23 | 0.04 |
| TOTAL | 23 | 23/23 | 1 |

INFORMATION PROCESSING APPARATUS, INFORMATION PROCESSING METHOD, AND PROGRAM

CROSS-REFERENCE TO RELATED APPLICATIONS

This is a U.S. National Stage Application under 35 U.S.C. § 371, based on International Application No. PCT/JP2018/036158, filed in the Japanese Patent Office as a Receiving Office on Sep. 28, 2018, which claims priority under 35 U.S.C. § 119(a)-(d) or 35 U.S.C. § 365(b) to Japanese Patent Application Number JP2017-232510, filed in the Japanese Patent Office on Dec. 4, 2017, each of which is hereby incorporated by reference in its entirety.

TECHNICAL FIELD

The present disclosure relates to an information processing apparatus, an information processing method, and a program.

BACKGROUND ART

In recent years, a service that uses a peer-to-peer database including blockchain data disclosed in Non-Patent Document 1 has been actively developed. Examples of such a service can include Bitcoin of Non-Patent Document 2, and the like, which uses blockchain data for exchange of a virtual currency. In the service that uses the peer-to-peer database including the blockchain data, it is possible to prevent tampering and the like of information managed in the peer-to-peer database to secure authenticity of the information.

CITATION LIST

Non-Patent Document

Non-Patent Document 1: Melanie Swan, "Blockchain", (U.S.), O'Reilly Media, Jan. 22, 2015
Non-Patent Document 2: Andreas M. Antonopoulos, "Mastering Bitcoin", (U.S.), O'Reilly Media, Dec. 1, 2014

SUMMARY OF THE INVENTION

Problems to be Solved by the Invention

Here, for example, in a proof of work (POW), which is a kind of consensus processing performed at the time of updating blockchain data, a huge amount of resources (information resources) and energy are consumed. Therefore, the present disclosure provides a new and improved information processing apparatus, information processing method, and program capable of more appropriately performing consensus processing regarding update of a peer-to-peer database.

Solutions to Problems

According to the present disclosure, there is provided an information processing apparatus including: an acquiring unit that acquires a value indicating an influence of a user; and a consensus processing unit that performs consensus processing regarding update of a P2P database on the basis of the value indicating the influence.

Furthermore, according to the present disclosure, there is provided an information processing method executed by a computer, including: acquiring a value indicating an influence of a user; and performing consensus processing regarding update of a P2P database on the basis of the value indicating the influence.

Furthermore, according to the present disclosure, there is provided a program for causing a computer to realize: acquiring a value indicating an influence of a user; and performing consensus processing regarding update of a P2P database on the basis of the value indicating the influence.

Effects of the Invention

As described above, according to the present disclosure, it is possible to more appropriately perform consensus processing regarding update of a peer-to-peer database.

Note that the effect described above is not necessarily restrictive, and any effect set forth in the present specification or other effects that can be grasped from the present specification may be accomplished together with or instead of the effect described above.

BRIEF DESCRIPTION OF DRAWINGS

FIG. 5B is a diagram for explaining an example of a method of distributing ICs.

MODE FOR CARRYING OUT THE INVENTION

Figure 1:
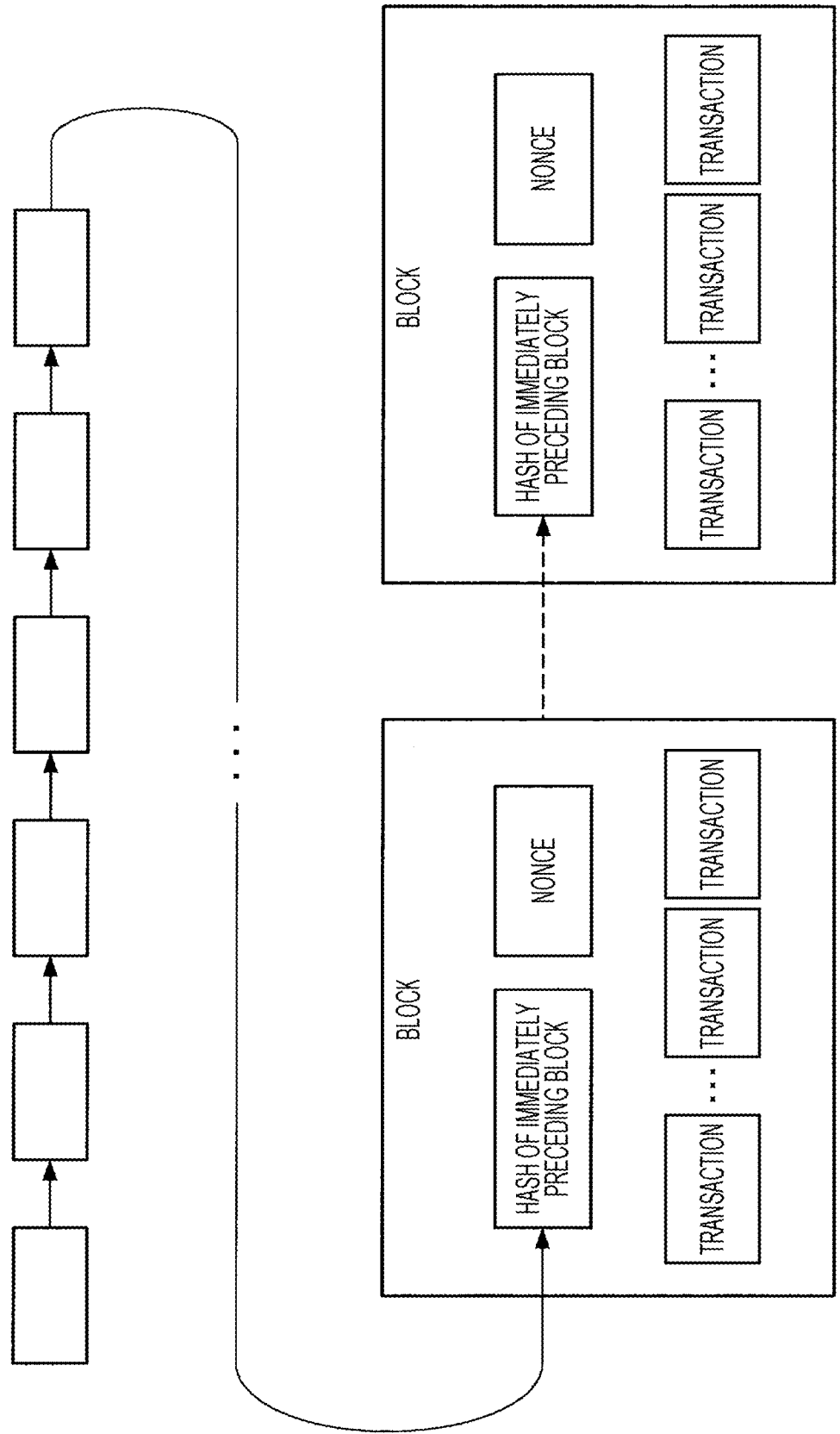
FIG. 1 is a diagram illustrating an overview of blockchain data, which is a kind of peer-to-peer database.

Hereinafter, preferred embodiments of the present disclosure will be described in detail with reference to the accompanying drawings. Note that, in the present specification and the drawings, components having substantially the same functional configuration will be denoted by the same reference numerals and an overlapping description will be omitted.

Note that a description will be given in the following order.
1. Overview of peer-to-peer database
2. Embodiment
2.1. Overview
2.2. System configuration example
2.3. Functional configuration example of influence evaluating apparatus 100

2.4. Flow of processing by influence evaluating apparatus 100

2.5. Hardware configuration example of influence evaluating apparatus 100

2.6. Application of IC

3. Modification

4. Summary

1. Overview of Peer-to-Peer Database

Before describing an embodiment of the present disclosure, an overview of a peer-to-peer database will be first described.

In an information processing system according to the present embodiment, a distributed peer-to-peer database distributed in a peer-to-peer network is used. Note that the peer-to-peer network may be called a peer-to-peer distributed file system. Hereinafter, the peer-to-peer network is referred to as a "P2P network", and the peer-to-peer database is referred to as a "P2P database". As a kind of P2P database, blockchain data distributed in the P2P network may be used. Therefore, first, an overview of a blockchain system will be described as an example.

As shown in FIG. 1, blockchain data is data including a plurality of blocks connected to each other as if the plurality of blocks was a chain. In each block, one or two or more target data can be stored as a transaction.

As shown in FIG. 1, the blockchain data includes, for example, a "hash value of the immediately preceding block" and a special value called "nonce".

The "hash value of the immediately preceding block" is information for connecting the immediately preceding block and a current block to each other, and is a hash value of the entire data included in the immediately preceding block. Furthermore, the "hash value of the immediately preceding block" also serves to detect the presence or absence of tampering and the like of data included in each block of the blockchain. More specifically, in a case where transaction data included in any block of the blockchain is tampered with, a hash value of the entire data included in the block changes, and a discrepancy thus occurs in a "hash value of the immediately preceding block" included in a block following the block, such that the presence or absence of the tampering of the data can be detected.

Furthermore, the "nonce" is information used for a POW, which is a kind of consensus processing performed at the time of updating the blockchain data. More specifically, a node apparatus connected to the P2P network outputs a hash value of the entire data included in a block that is to be added while variously changing a "nonce" in the block, in the consensus processing. Then, a node apparatus that could generate a hash value satisfying a predetermined condition earliest (in other words, could earliest find a nonce generating a hash value satisfying a predetermined condition) can designate a block to be newly added.

Figure 2:
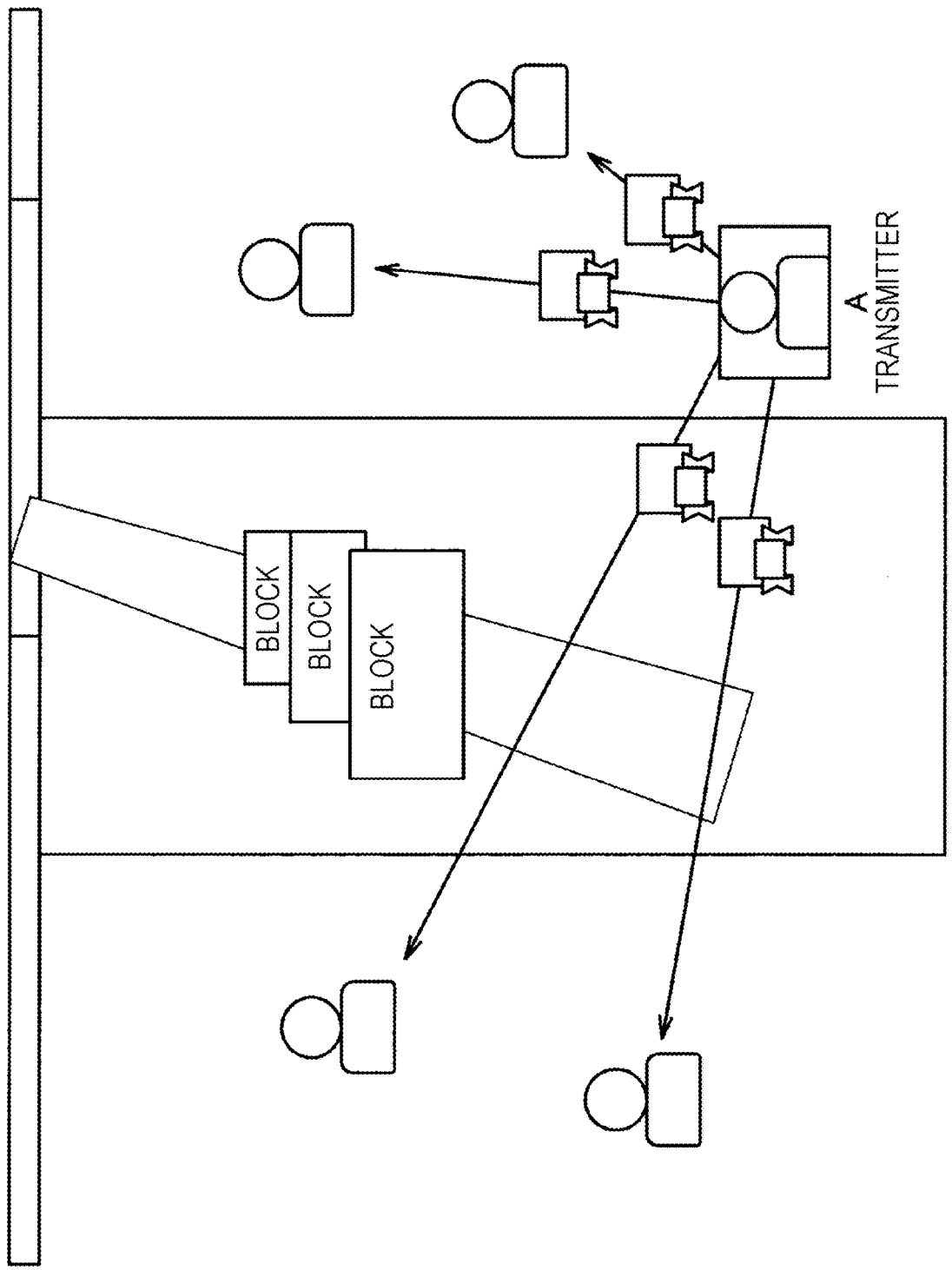
FIG. 2 is a diagram illustrating an overview of blockchain data, which is a kind of peer-to-peer database.

FIG. 2 is a diagram showing a state in which target data is registered by user A in the blockchain system. User A electronically signs the target data to be registered in the blockchain data using private key of user A. Then, user A broadcasts a transaction including the electronically signed target data on the P2P network. Therefore, it is secured that an owner of the target data is user A.

Figure 3:
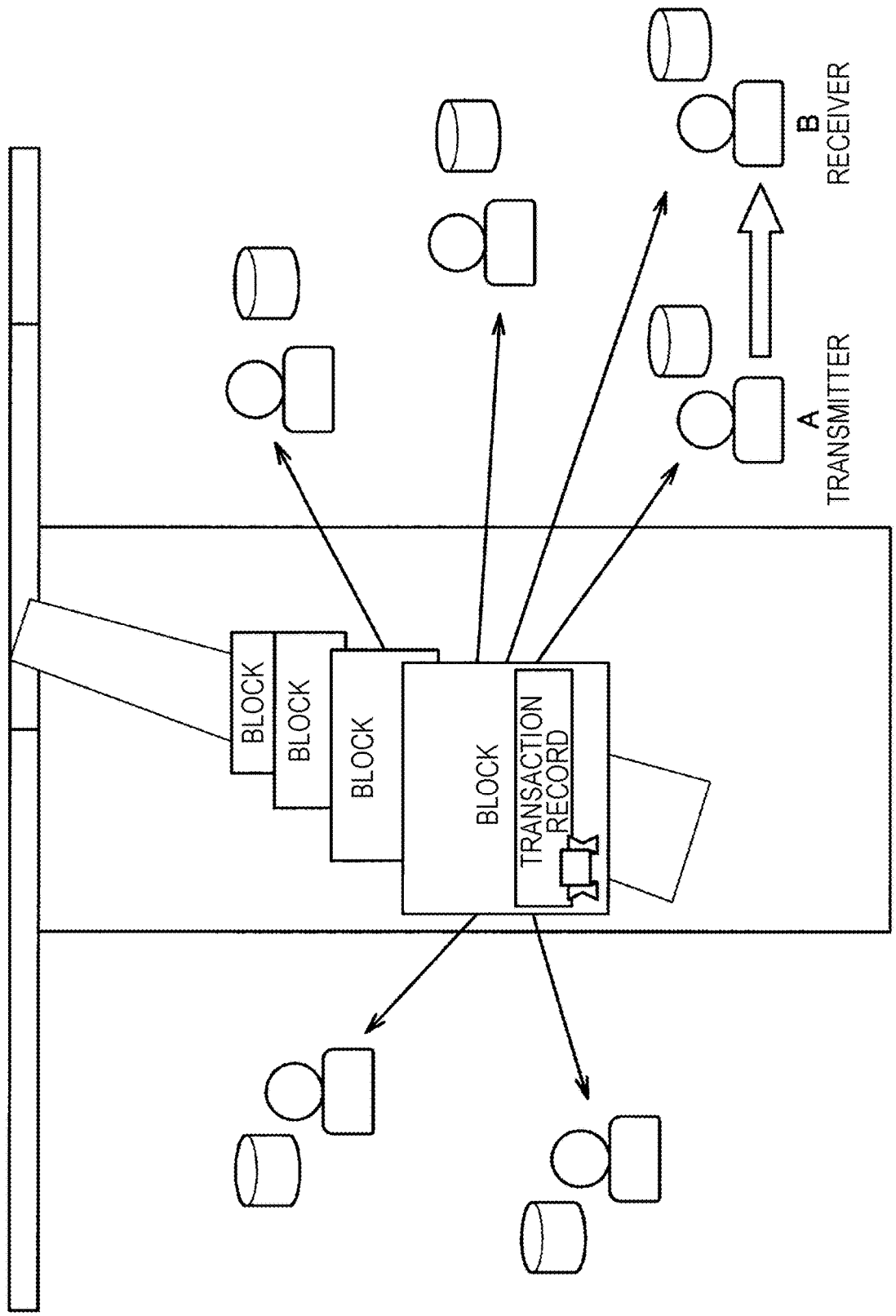
FIG. 3 is a diagram illustrating an overview of blockchain data, which is a kind of peer-to-peer database.

FIG. 3 is a diagram showing a state in which the target data is transferred from user A to user B in the blockchain system. User A performs an electronic signature using the private key of user A in the transaction, and includes a public key of user B in the transaction. Therefore, it is indicated that the target data has been transferred from user A to user B.

Furthermore, in the blockchain system, for example, by using sidechain technology, it is possible to include other target data different from a virtual currency in blockchain data used for exchange of data of an existing virtual currency, such as blockchain data of Bitcoin, and the like.

2. Embodiment

The overview of the P2P database has been described hereinabove. Next, an embodiment of the present disclosure will be described.

2.1. Overview

First, an overview of an embodiment of the present disclosure will be described.

In the POW described above, which is a kind of consensus processing performed at the time of updating the blockchain data, a huge amount of arithmetic processing is performed by each node apparatus until a nonce is found. Therefore, a huge amount of resources and energy are consumed. Therefore, there is a demand for the development of technology capable of reducing resources and energy required for the consensus processing while securing tamper resistance.

Therefore, the present disclosers have invented the present disclosure in view of the circumstance described above. An information processing system according to the present disclosure calculates a value indicating an influence of a user, and performs consensus processing regarding update of a P2P database on the basis of the value. More specifically, the information processing system according to the present disclosure determines a difficulty level of the consensus processing on the basis of the value indicating the influence of the user (for example, lowers the difficulty level of the consensus processing as the influence of the user becomes strong, or the like).

Therefore, the information processing system according to the present disclosure can reduce resources and energy required for the consensus processing while securing tamper resistance. More specifically, in a case where a user having a relatively strong influence as compared with other users illegally tampers with an updated content of the P2P database, reliability of the entire system is decreased, such a value of an influence of the user in the present system is decreased, and it is thus unlikely that the user having the relatively strong influence as compared with other users will perform the illegal tampering. Furthermore, in the information processing system according to the present disclosure, an amount of calculation in the consensus processing is decreased by lowering the difficulty level of the consensus processing as the influence of the user becomes strong, and the resources and the energy required for consensus processing can be suppressed to be lower than those of the POW.

Now, here, various technology for quantifying the influence has been developed. For example, in an education field, there is an h-index (Hirsch index) indicating an influence in a research field (or an influence of a paper) of the user on the basis of the number of citations of a paper contributed by the user, and the like. The h-index is used to quantify an influence in Google Scholar, which is primarily aimed at a search in an academic application.

However, in existing technology for quantifying the influence, accuracy may not be enough. For example, the h-index is calculated on the basis of the number of citations of the paper rather than a quality of the paper, and is thus disadvantageous for researchers with a short career, who contribute a small number of papers and whose contributed papers are cited in a small number.

As technology for solving such a problem, a relative citation ratio (RCR) has been developed. The relative citation ratio is an index value of an influence of a paper calculated in consideration of other similarly cited papers in a case where a paper to be evaluated is cited. However, a target field in which the relative citation ratio can calculate the influence of the paper with high accuracy is restrictive.

Furthermore, depending on an index value called Altmetrics, it is possible to consider various factors indicating an influence of a paper, such as the number of times of reference, the number of times of browsing, and the number of times of download of the paper, mention of the paper by social media or mess communication, and the like. However, a new paper is actively mentioned on the social media and the like at the time of being disclosed, and it is thus easy for the new paper to be highly evaluated. Therefore, in the Altmetrics, it is not possible to appropriately compare influences of papers disclosed at different times with each other.

Furthermore, with the technology described above, it is difficult to evaluate an influence of the user other than a result of research such as the paper and the like. For example, with the technology described above, it is difficult to evaluate the influence of the user on the basis of behavior on the Internet (for example, sharing, evaluation, or disclosure on a blog of information in social media, development of an open source code, or the like), and the like.

Therefore, the information processing system according to the present disclosure makes it possible to more appropriately quantify the influence of the user. The influence according to the present disclosure may be replaced with some concept corresponding to the influence. For example, the influence according to the present disclosure may be replaced with reliability, credibility, value, or the like. Hereinafter, details of the quantification of the influence will be described.

2.2. System Configuration Example

The overview of the present disclosure has been described hereinabove. Next, a configuration example of an information processing system according to an embodiment of the present disclosure will be described with reference to FIG. 4.

Figure 4:
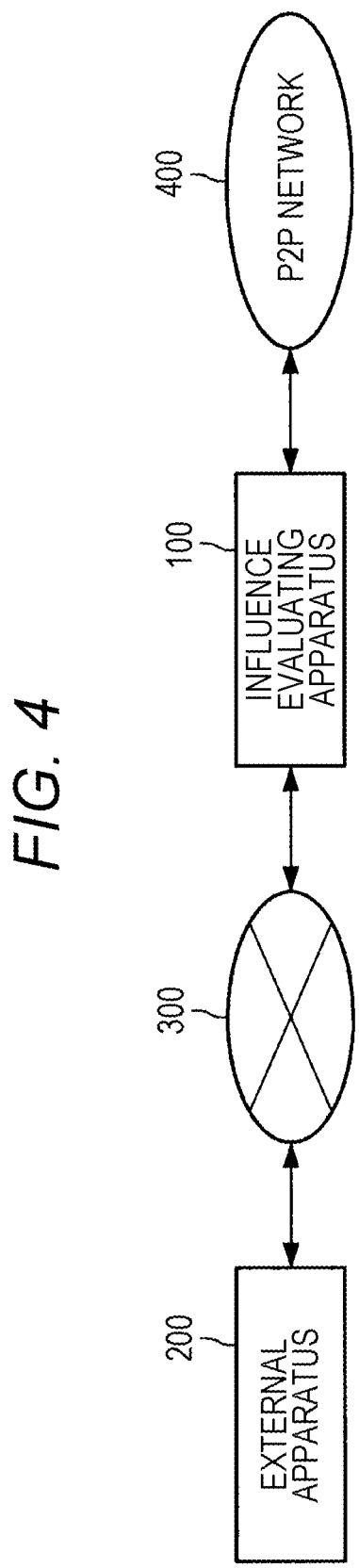
FIG. 4 is a diagram illustrating a configuration example of an information processing system according to the present embodiment.

As shown in FIG. 4, the information processing system according to the present embodiment includes an influence evaluating apparatus 100 and an external apparatus 200, and the influence evaluating apparatus 100 and the external apparatus 200 are connected to each other by a network 300. Furthermore, the influence evaluating apparatus 100 holds a P2P database by connecting to a P2P network 400, and functions as a so-called node apparatus. Furthermore, although not shown, it is assumed that another apparatus (or another influence evaluating apparatus 100) that functions as a node apparatus is connected to the P2P network 400. Note that a configuration of the information processing system according to the present embodiment is not limited to a configuration of FIG. 4.

(Influence Evaluating Apparatus 100)

The influence evaluating apparatus 100 is an information processing apparatus that evaluates an influence of a user. More specifically, in a case where another user (hereinafter, also referred to as a "second user") performs some event using arbitrary information provided by a user (hereinafter, also referred to as a "first user"), which is a target to be evaluated, the influence evaluating apparatus 100 considers that the first user has affected the event, and evaluates an influence of the first user.

Note that the user is not limited to an individual. For example, the user may be an arbitrary organization or an arbitrary association (for example, a company, a university, a society, a circle, and the like). The user is given an ID as identification information, and is managed in the P2P database held by the influence evaluating apparatus 100.

Furthermore, the event includes that the second user provides another piece of arbitrary information using the arbitrary information provided by the first user. For example, the event includes that the second user provides a paper citing a paper provided by the first user after the first user provides the paper, and the like, and the influence evaluating apparatus 100 calculates a value indicating an influence of the first user on the basis of the event. Furthermore, the event includes sharing of the paper, performance of "Like!" on Facebook (registered trademark), performance of "+1" on Google+ (registered trademark), performance of "retweet" on Twitter (registered trademark), performance of "good/bad evaluation", performance of "useful/not useful" or performance of "5-level evaluation" on the paper, contribution of a comment to the paper or the like, by the second user after the first user provides the paper. Note that a content of the event is not limited to those described above. Furthermore, the "arbitrary information" in the present embodiment is not limited to the paper, and may be arbitrary information generated by each event as described above.

Furthermore, in the present embodiment, information generated without using the arbitrary information is referred to as "de novo (DN) information". For example, a paper created without citing another paper at all, a blog or an open source code independently contributed by the user, and the like, is DN information.

Furthermore, in the present embodiment, information generated using the arbitrary information is referred to as "indebted (ID) information". For example, a paper created by citing another paper, a blog contributed by citing another blog, information generated by sharing and the like of information provided on social media, and the like, are ID information. In other words, the influence evaluating apparatus 100 evaluates an influence of a user who has provided the DN information or the ID information on the basis of ID information provided using the DN information or the ID information.

The influence evaluating apparatus 100 calculates influence credits (ICs) as values indicating influences of the users. More specifically, the influence evaluating apparatus 100 issues the ICs for each event performed using the arbitrary information, distributes the ICs to each user, and accumulates the ICs. In other words, the IC is not distributed at a point in time when the DN information is provided, and the IC is distributed to a user who has provided the DN information at a point in time when the ID information is provided using the DN information. Furthermore, in a case where another ID information is provided using the ID information, the IC is distributed to a user who has provided original ID information at a point in time when another ID information was provided. Then, the accumulated ICs indicate an influence of the user at that point in time.

Furthermore, the influence evaluating apparatus 100 associates the DN information and the ID information with each other in a chained manner on the basis of occurrence of the event. Here, a more specific description will be given with reference to FIG. 5A. It is assumed that a certain user has provided Paper 1, which is DN information, in Hierarchy 1 of FIG. 5A. Thereafter, it is assumed that Paper 2, Paper 3, and two other papers, which cite Paper 1 to be ID information, are provided in Hierarchy 2, Paper 4, which cites Paper 2 and Paper 3 to be ID information, and sixteen other papers, which cite Paper 2 to be ID information, are provided in Hierarchy 3, and Paper 5, which cites Paper 4 to be ID information, is provided in Hierarchy 4. In this case, the influence evaluating apparatus 100 associates papers of citation sources and papers of citation destinations with each other in a chained manner. Note that a method of the association is not particularly limited.

Then, in a case where an event in which another ID information is newly associated with the subsequent stage of the DN information or ID information occurs, the influence evaluating apparatus 100 distributes the ICs to users who have provided the DN information of the preceding stage or each ID information. For example, the IC is distributed to the user who has provided Paper 1 when Paper 2 to Paper 5, two other papers, or sixteen other papers are associated with Paper 1. Similarly, the IC is distributed to a user who has provided Paper 2 when Paper 4, Paper 5, or sixteen other papers are associated with Paper 2, the IC is distributed to a user who has provided Paper 3 when Paper 4 or Paper 5 is associated with Paper 3, and the IC is distributed to a user who has provided Paper 4 when Paper 5 is associated with Paper 4. Note that since no information is associated with the subsequent stage of Paper 5 as described above, the IC is not distributed to a user who has provided Paper 5.

The ICs distributed to each user may be determined on the basis of, for example, the number of citations of each paper. Here, a specific example of a method of distributing the ICs in a case where Paper 5 is provided and is associated with Paper 4 will be described with reference to FIG. 5B. As described above, in a case where Paper 5 is associated with Paper 4, the ICs are distributed to the users who have provided Paper 1 to Paper 4. As shown in FIG. 5B, the number of citations of each paper is "4" in Paper 1, "17" in Paper 2, "1" in Paper 3, and "1" Paper 4, and a total number of citations of Paper 1 to Paper 4 is thus "23".

The ICs distributed to provision users of each paper are determined on the basis of a ratio of the number of citations of paper of each user to the total number of citations. For example, assuming that an IC newly issued by associating Paper 5 is "1", the IC distributed to a provision user of Paper 1 is "0.17 (a value obtained by rounding off the third decimal place)", which is "4/23" of the issued IC "1". Similarly, the IC distributed to a provision user of Paper 2 is "0.74", and the ICs distributed to a provision user of Paper 3 and a provision user of Paper 4 are "0.04".

Note that the method of distributing the ICs is not limited to that described above. Furthermore, the ICs issued by occurrence of each event are not determined to be "1" as described above, and are determined by various factors. Variations on the method of determining the ICs issued by the occurrence of each event and the method of distributing the ICs will be described later.

Here, as described above, the DN information and the ID information include not only papers but also arbitrary information, and the influence evaluating apparatus 100 can thus evaluate the influences of each user with higher accuracy. For example, the influence evaluating apparatus 100 can evaluate the influences of each user in consideration of behavior (example, sharing, evaluation, or disclosure on a blog of information in social media, development of an open source code, or the like) of each user online. Furthermore, even in a case where each user behaves (for example, purchases a product or the like, publishes a book, or the like) offline, the influence evaluating apparatus 100 can evaluate the influences of each user in consideration of the behavior of each user offline if it can acquire information regarding an event that has occurred on the basis of this behavior.

Then, the influence evaluating apparatus 100 registers and manages the ICs owned by each user in the P2P database. More specifically, the influence evaluating apparatus 100 generates a transaction on the basis of the ICs distributed to each user, and registers the transaction in the P2P database. Therefore, the influence evaluating apparatus 100 can prevent the ICs distributed to each user from being tampered with to secure authenticity.

Then, the influence evaluating apparatus 100 performs consensus processing at the time of updating the P2P database on the basis of the ICs owned by each user. More specifically, the influence evaluating apparatus 100 determines a difficulty level of the consensus processing on the basis of the ICs owned by each user (for example, lowers the difficulty level of the consensus processing as the influence of the user becomes strong, or the like). Therefore, the influence evaluating apparatus 100 can reduce resources and energy required for the consensus processing while securing tamper resistance of the P2P database. Details of the consensus processing will be described later.

Furthermore, the ICs owned by each user can be used for various applications. For example, the ICs may be used as a security of credit of a user who owns the ICs. Furthermore, in an arbitrary service, a service content, price, or the like may be determined on the basis of the ICs owned by each user. Furthermore, the ICs may be used as a compensation for provision of a product or a service like a virtual currency. In other words, the ICs may be transferred from a user to whom the product or the like has been provided to a user who has provided the product or the like by using the ICs as the compensation for the provision of the product or the service. Details of an application of the IC will be described later.

Note that a kind of the information evaluating apparatus 100 is not particularly limited. For example, the influence evaluating apparatus 100 may be an arbitrary apparatus such as a general-purpose computer, a personal computer (PC), a tablet PC, and the like.

(P2P Network 400)

The P2P network 400 is a network in which the P2P database is distributed. As described above, by connecting the influence evaluating apparatus 100 functioning as the node apparatus to the P2P network 400, it is possible to update the P2P database while maintaining consistency with the P2P database held by the other node apparatuses.

Note that a kind of the P2P network 400 is not particularly limited. For example, the P2P network 400 may be any one of a consortium type operated by a plurality of organizations, a private type operated by a single organization, or a public type that does not specifically limit participants.

Note that a communication manner, a kind of line, and the like, used for the P2P network 400 are not particularly limited. For example, the P2P network 400 may be realized by a dedicated line network such as an Internet protocol-virtual private network (IP-VPN) and the like. Furthermore, the P2P network 400 may be realized by a public line network such as the Internet, a telephone line network, a satellite communication network, and the like, various local area networks (LANs) including Ethernet (registered trademark), a wide area network (WAN), and the like. Moreover, the P2P network 400 may be realized by a wireless communication network such as Wi-Fi (registered trademark), Bluetooth (registered trademark), and the like.

(External Apparatus 200)

The external apparatus 200 is an apparatus that provides various services via an arbitrary network (for example, the Internet and the like) or an apparatus of a user who uses various services. For example, the external apparatus 200 is an apparatus that provides various services regarding social media, a paper publishing site, a blog site, or another arbitrary website, or an apparatus of a user who uses these various services.

Then, the external apparatus 200 provides information regarding the event (hereinafter, referred to as "event information") to the influence evaluating apparatus 100. More specifically, when each user provides the DN information or the ID information online, the external apparatus 200 generates the event information including information regarding the provided DN information or ID information, and transmits the event information to the influence evaluating apparatus 100. Therefore, the influence evaluating apparatus 100 can detect the event.

Here, the event information includes at least information called "main information", and the main information includes identification information of the event, a kind of the event, identification information of a user who has performed the event, a date and time of occurrence of the event, identification information of arbitrary information (for example, a paper, and the like) provided by the event and details thereof (for example, a title, a description of a content, and the like), and the like. Furthermore, the event information regarding the provision of the ID information includes information called "support information" in addition to the main information, and the support information includes identification information of other information (DN information or ID information) used for providing the ID information and details thereof (for example, a title, a description of a content, identification information of a creating user, and the like), and the like. The main information and the support information are used for issuing processing of the ICs and distribution processing of the ICs. Note that the information included in the event information is not limited to those described above.

Furthermore, in a case where it is necessary to confirm the influence of the user in providing various services, the external apparatus 200 generates provision request information for requesting provision of information regarding the IC (hereinafter, also referred to as "IC information"), and transmits the provision request information to the influence evaluating apparatus 100. Therefore, the external apparatus 200 can acquire the IC information from the influence evaluating apparatus 100, and can provide the various services using the IC information. Note that information included in the IC information is not particularly limited. For example, the IC information includes not only the IC owned by the user, but also information regarding the user (for example, user identification information, and the like), a date and time when the IC information is acquired, information regarding the influence evaluating apparatus 100 from which the IC information is acquired (for example, identification information and the like of the influence evaluating apparatus 100), and the like. Furthermore, similarly to the influence evaluating apparatus 100, a kind of the external apparatus 200 is not particularly limited.

(Network 300)

The network 300 is a network that connects the influence evaluating apparatus 100 and the external apparatus 200 to each other. Note that, similarly to the P2P network 400, a communication manner, a kind of line, and the like, used for the network 300 are not particularly limited.

The configuration example of the information processing system according to the present embodiment has been described hereinabove. Note that the configuration described above with reference to FIG. 4 is only an example, and a configuration of the information processing system according to the present embodiment is not limited to such an example. For example, some of the functions of the influence evaluating apparatus 100 may be provided in the external apparatus 200. In other words, the external apparatus 200 may participate in the P2P network 400 to hold the P2P database. Furthermore, some of the functions of the external apparatus 200 may be provided in the influence evaluating apparatus 100. For example, software (for example, a WEB application using a predetermined application programming interface (API), and the like) that provides some of the functions of the external apparatus 200 may be executed on the influence evaluating apparatus 100. The configuration of the information processing system according to the present embodiment can be flexibly modified according to specifications and operations.

2.3. Functional Configuration Example of Influence Evaluating Apparatus 100

The configuration example of the information processing system according to the present embodiment has been described hereinabove. Next, a functional configuration example of the influence evaluating apparatus 100 will be described with reference to FIG. 6.

Figure 6:
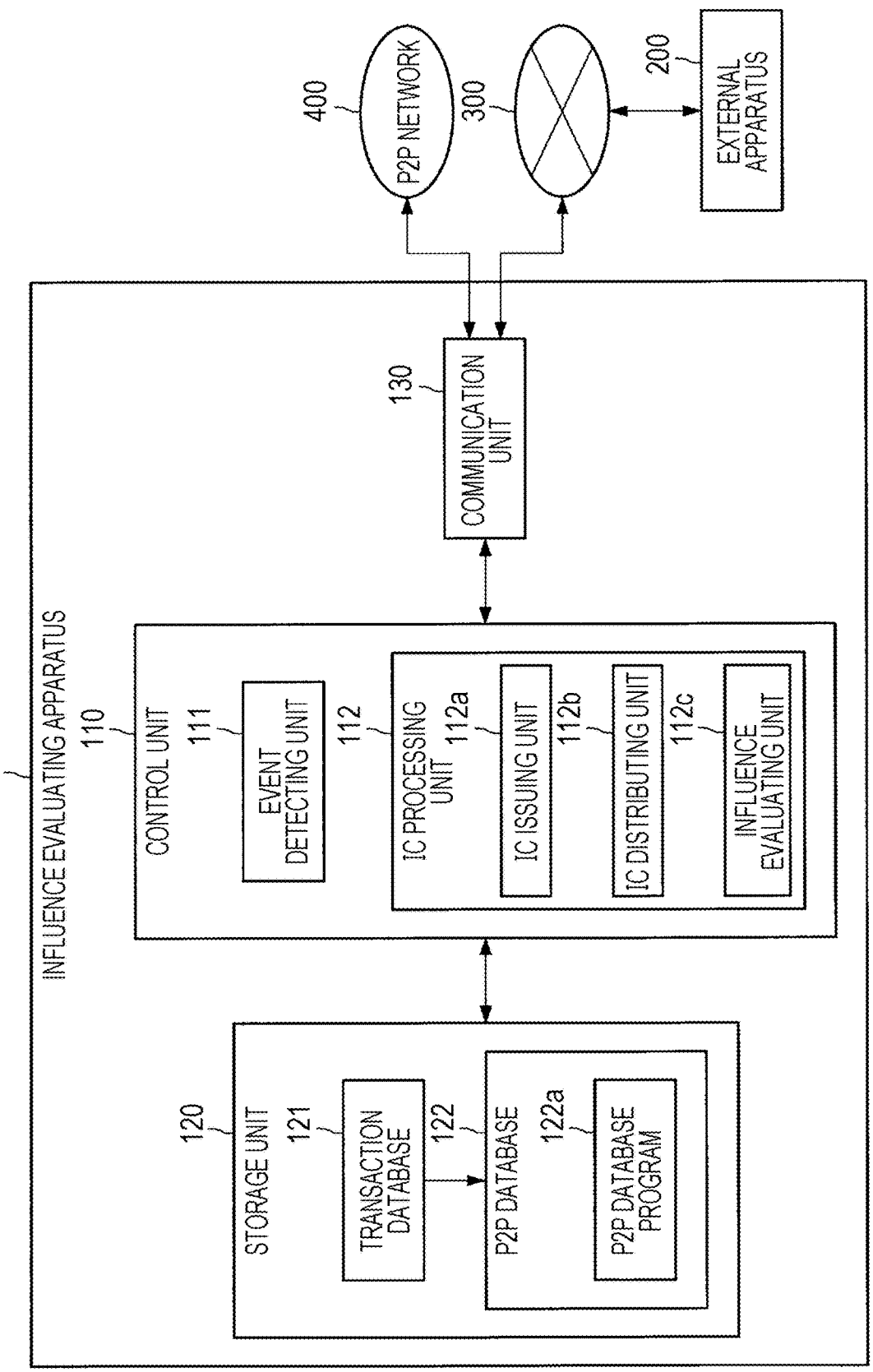
FIG. 6 is a block diagram showing a functional configuration example of an influence evaluating apparatus 100 according to the present embodiment.

As shown in FIG. 6, the influence evaluating apparatus 100 includes a control unit 110, a storage unit 120, and a communication unit 130. Furthermore, the control unit 110 includes an event detecting unit 111 and an IC processing unit 112, and the IC processing unit 112 includes an IC issuing unit 112a, an IC distributing unit 112b, and an influence evaluating unit 112c. Furthermore, the storage unit 120 includes a transaction database 121 and a P2P database 122, and the P2P database 122 includes a P2P database program 122a.

(Control Unit 110)

The control unit 110 is a functional configuration that comprehensively controls general processing performed by the influence evaluating apparatus 100. For example, by generating a control signal and providing the control signal to each functional configuration, the control unit 110 can control start, stop, or the like of each functional configuration. Note that a function of the control unit 110 is not limited to that described above. For example, the control unit 110 may control processing generally performed in various servers, general-purpose computers, PCs, tablet PCs, and the like.

(Event Detecting Unit 111)

The event detecting unit 111 is a functional configuration that detects an event. More specifically, in a case where the user creates the DN information or the ID information, the external apparatus 200 generates the event information and transmits the event information to the influence evaluating apparatus 100. Then, the event detecting unit 111 detects the event by analyzing the event information. As described above, the event information includes the main information or the support information. Here, the event detecting unit 111 may edit the event information provided from the external apparatus 200. For example, in a case where the event detecting unit 111 analyzes the event information and decides that the main information or the support information included in the event information is incomplete or includes an error, the event detecting unit 111 may supplement or correct these pieces of information.

A trigger by which the external apparatus 200 transmits the event information to the influence evaluating apparatus 100 is not particularly limited. For example, the event detecting unit 111 may cause the external apparatus 200 to transmit the event information by generating provision request information for requesting provision of the event information periodically or at a predetermined timing and transmitting the provision request information to the external apparatus 200. Alternatively, software (for example, a WEB application using a predetermined API, and the like) capable of detecting the event and transmitting the event information to the influence evaluating apparatus 100 may be installed in the external apparatus 200, and the software may generate the event information and transmit the event information to the influence evaluating apparatus 100 every time the event occurs.

The event detecting unit 111 generates a transaction on the basis of the acquired event information, and provides the transaction to the transaction database 121. Therefore, the event information is registered in the P2P database 122. Note that the event detecting unit 111 may register the event information in a database other than the P2P database 122.

(IC Processing Unit 112)

The IC processing unit 112 is a functional configuration that includes the IC issuing unit 112a, the IC distributing unit 112b, and the influence evaluating unit 112c, as described above, and realizes processing regarding the IC by using each of these functional configurations to evaluate the influences of the users. In other words, the IC processing unit 112 is a functional configuration that functions as a calculating unit that calculates the ICs of each user.

(IC Issuing Unit 112a)

The IC issuing unit 112a is a functional configuration that issues the ICs on the basis of the event information. More specifically, the IC issuing unit 112a acquires the event information from the P2P database 122, determines an amount of ICs to be issued by analyzing the event information, and issues the ICs. Various methods can be used to determine the amount of ICs to be issued.

For example, the IC issuing unit 112a may determine the amount of ICs to be issued on the basis of media to which the DN information or the ID information has been provided by the users. Here, the media to which the DN information or ID information is provided include, for example, social media, a paper publishing site, a blog site, another arbitrary website, a television a magazine, or the like. The IC issuing unit 112a evaluates an influence of each medium on the basis of the number of active users, the number of accesses, an audience rating, a circulation, and the like of each medium, and may issue more ICs as an influence of the medium to which the DN information or the ID information is provided becomes great.

Furthermore, the IC issuing unit 112a may determine the amount of ICs to be issued on the basis of the users who have provided the DN information or the ID information. More specifically, the IC issuing unit 112a may acquire the ICs indicating the influences of the users who have provided the DN information or the ID information, from the P2P database 122, and issue more ICs as the influences of the users become great, on the basis of the ICs. Furthermore, in a case where the same user has generated an event using DN information or ID information provided by himself/herself or a plurality of users belonging to the same community has generated an event for mutual DN information or ID information, the IC issuing unit 112a may reduce the amount of ICs to be issued or set the amount of ICs to be issued to zero, in order to prevent an intentional operation of the ICs.

Furthermore, the IC issuing unit 112a may determine the amount of ICs to be issued on the basis of a type (or a kind, a class, or the like) of the DN information or the ID information. For example, the IC issuing unit 112a recognizes that the DN information or the ID information is any type of a paper, a blog, an open source code, sharing of arbitrary information, "Like!" on Facebook (registered trademark), "+1" on Google+ (registered trademark), "retweet" on Twitter (registered trademark), "good/bad evaluation", "useful/not useful" or "5-level evaluation", a comment, or the like, for the arbitrary information by analyzing a data amount, a format, other parameters, or the like, of the DN information or the ID information. Then, the IC issuing unit 112a may issue more ICs as an influence of a type of the DN information or the ID information becomes great. For example, in a case where an amount of ICs to be issued in a case where the type of the DN information or the ID information is the paper may be larger than an amount of ICs to be issued in a case where the type of the DN information or the ID information is "Like!" on Facebook (registered trademark) (In this case, an influence of the paper is decided to be greater than an influence of "Like!" on Facebook (registered trademark).

Furthermore, the IC issuing unit 112a may determine the amount of issued ICs on the basis of a content of the DN information or the ID information. For example, the IC issuing unit 112a analyzes the content of the DN information or the ID information using known text analysis technology and the like to recognize the content (for example, a keyword and the like included in the DN information or the ID information) of the DN information or the ID information. Then, the IC issuing unit 112a may evaluate an influence or a quality of the content of the DN information or the ID information, and issue more ICs as the influence of the content of the DN information or ID information becomes strong or as the quality of the DN information or ID information becomes high. Note that in a case where the DN information or ID information is data (for example, image data, moving image data and the like) other than text data, the IC issuing unit 112a recognizes the content of the DN information or ID information by using analysis technology according to a format of the data. Furthermore, the influence or the quality of the DN information or ID information may be evaluated on the basis of an impact factor of a journal in which the DN information or ID information is published.

Furthermore, the IC issuing unit 112a may determine the amount of issued ICs on the basis of creativity of the DN information or the ID information. More specifically, the DN information is created independently by the user, such that there is a possibility that a value of the DN information will be high than that of the ID information. In that case, the IC issuing unit 112a may make an amount of ICs issued on the basis of the DN information larger than an amount of ICs issued on the basis of the ID information. Furthermore, the IC issuing unit 112a may make an amount of ICs issued on the basis of ID information having a lower ratio of citation information larger than an amount of ICs issued on the basis of ID information having a higher ratio of citation information. Furthermore, in a case where the same user provides substantially the same or similar information plural times (this case includes not only a case where a format of the information is the same or similar, but also a case where a content of the information is the same or similar), the IC issuing unit 112a may recognize the information by a predetermined analysis method (for example, a text analysis and the like) and decide that creativity of the information is not high to reduce the amount of ICs to be issued.

Note that the IC issuing unit 112*a* may issue the ICs in a plurality of division units. More specifically, the user basically has different influences for each division such as a field (for example, a research field or the like), an industry, a region (for example, a country or the like), an association (for example, a company, a union, a circle, or the like), an organization (for example, a family, a group, or the like), a medium (for example, social media, a paper publishing site, a blog site, another arbitrary website, a television, a magazine, or the like), or the like. Therefore, the IC issuing unit 112*a* may issue the ICs in each division unit such as the field, the industry, the region, the association, the organization, the medium, or the like. Therefore, the influence of the user in each division is more appropriately reflected. In this case, the IC issuing unit 112*a* adds information (for example, a tag or the like) indicating the division to the ICs. Note that the division is not limited to the field, the industry, the region, the association, the organization, the medium, or the like, described above.

Furthermore, the IC issuing unit 112*a* may change output depending on whether the user has a "good influence" or has a "bad influence". For example, the IC issuing unit 112*a* may output a good influence by an IC having a positive value, output a bad influence by an IC having a negative value, and then output an IC obtained by adding up the IC having the positive value and the IC having the negative value. Furthermore, the IC issuing unit 112*a* may output the good influence by an IC having a positive value, output the bad influence by "0", and then output an IC obtained by adding up the IC having the positive value and 0. Furthermore, the IC issuing unit 112*a* may distinguish and output an IC indicating the good influence and an IC indicating the bad influence. In this case, the IC issuing unit 112*a* adds information (for example, a tag or the like) that can distinguish the IC having the good influence and the IC having the bad influence from each other. Note that a method of issuing the ICs by the IC issuing unit 112*a* is not limited to those described above.

(IC Distributing Unit 112*b*)

The IC distributing unit 112*b* is a functional configuration that distributes the ICs issued by the IC issuing unit 112*a* to each user. More specifically, the IC distributing unit 112*b* grasps a relationship (for example, a citation relationship of a paper, or the like) between the DN information and the ID information by analyzing the main information and the support information included in the event information acquired from the P2P database 122, and associates the DN information and the ID information with each other in a chained manner.

Figure 5A:
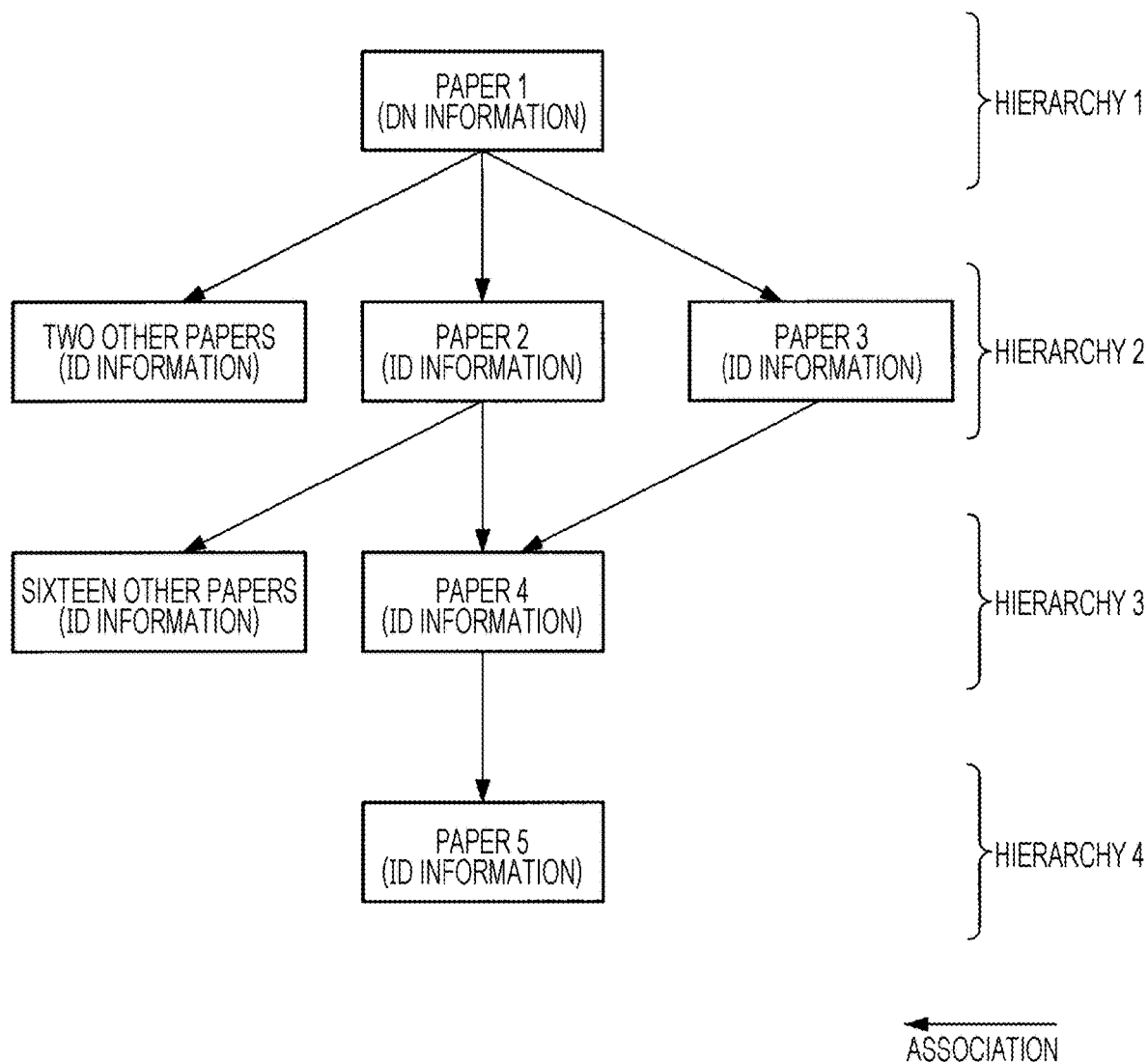
FIG. 5A is a diagram illustrating an example of association between DN information and ID information.

Then, the IC distributing unit 112*b* distributes the ICs on the basis of the number of citations of each paper, for example, as described with reference to FIGS. 5A and 5B. More specifically, the IC distributing unit 112*b* grasps provision users of the associated DN information and ID information (in other words, users to whom the ICs are to be distributed). Furthermore, the IC distributing unit 112*b* grasps the number of ID information (for example, the number of citations of each paper, or the like) used for providing the associated DN information and ID information, and determines distribution ratios of the ICs for each user on the basis of the number of ID information.

Note that the method of distributing the ICs is not limited to those described above. For example, there is a possibility that information (in other words, newer information) associated near newly provided information among each piece of information associated in a chained manner would have a greater influence on the new provided information. Therefore, the IC issuing unit 112*a* may perform predetermined weighting so that more ICs are distributed to the information associated near the newly provided information among each piece of information associated in the chained manner.

Furthermore, the IC distributing unit 112*b* may control distribution of the ICs by performing predetermined weighting on the basis of the media to which the DN information or the ID information is provided, the users who have provided the DN information or the ID information, the type of the DN information or the ID information, the content of the DN information or the ID information, the creativity of the DN information or the ID information, or the like, so that the IC issuing unit 112*a* controls the amount of ICs to be issued.

Note that the IC distributing unit 112*b* may distribute the ICs not only to the users who have provided the DN information or the ID information but also to other users related to the users. For example, in a case where a certain paper is cited in another paper, there is a case where not only an influence of an author of an original paper may be evaluated, but also an influence of a research team to which the author belongs, a representative of the research team, or the like, may be evaluated. Therefore, the IC distributing unit 112*b* may distribute the ICs not only to the author of the original paper but also to the research team to which the author belongs, the representative of the research team, or the like by a predetermined method.

The IC distributing unit 112*b* generates a transaction on the basis of the ICs distributed to each user, and provides the transaction to the transaction database 121. Therefore, the ICs distributed to each user are registered in the P2P database 122.

(Influence Evaluating Unit 112*c*)

The influence evaluating unit 112*c* is a functional configuration that evaluates the influence of the user on the basis of the IC. For example, in a case where it is necessary to confirm the influence of the user in providing various services, the external apparatus 200 transmits the provision request information for requesting the provision of the IC information to the influence evaluating apparatus 100. The provision request information includes at least identification information of a user of a request target. Then, the influence evaluating unit 112*c* acquires the IC information from the P2P database 122 on the basis of the provision request information.

Here, the external apparatus 200 may include information regarding a division (for example, a field, an industry, a region, an association, an organization, a medium, or the like) of ICs of the request target, in the provision request information. The influence evaluating unit 112*c* acquires IC information corresponding to the division included in the provision request information from the P2P database 122, and transmits the IC information to the external apparatus 200. Therefore, the external apparatus 200 can confirm an influence of the user regarding a desired division.

Furthermore, the external apparatus 200 may include information regarding a period during which the ICs are distributed, in the provision request information. The influence evaluating unit 112*c* acquires IC information distributed during the period from the P2P database 122, and transmits the IC information to the external apparatus 200. The influence of the user usually changes over time. The external apparatus 200 can confirm the influence of the user in a desired period by including information regarding the period in which the ICs are distributed, in the provision request information.

Furthermore, the external apparatus 200 may include a request to provide IC information based on a relationship with another user in the provision request information. For example, the external apparatus 200 may include a request to also provide IC information of another user similar to an attribute (for example, an age, a gender, or a nationality) or history information (for example, learning history information, job history information, behavior history information, purchase history information, or the like) of the user of the request target, in the provision request information. Note that the information included in the provision request information is not limited to those described above.

(Storage Unit 120)

The storage unit 120 is a functional configuration that stores various types of information. For example, the storage unit 120 stores programs, parameters, or the like used by each functional configuration of the influence evaluating apparatus 100. Note that the information stored in the storage unit 120 is not limited to those described above.

(Transaction Database 121)

The transaction database 121 is a functional configuration to store transactions registered in the P2P database 122. For example, the transaction database 121 stores a transaction generated on the basis of the event information by the event detecting unit 111, a transaction generated on the basis of the ICs distributed by the IC distributing unit 112b, or the like. Note that information stored in the transaction database 121 is not limited to those described above. The transaction stored in the transaction database 121 is registered in the P2P database 122 after consensus processing is performed by the P2P database program 122a.

(P2P Database 122)

The P2P database 122 is a database that is commonly held by each node apparatus including the influence evaluating apparatus 100 and is, for example, blockchain data. Various history information including the event information is registered in the P2P database 122.

The history information may be, for example, learning history information including a learning achievement record (for example, a record regarding an examination result, a received award, an acquired credit, an acquired qualification, or the like) of the user, an activity record (for example, a record regarding a club activity, a student council activity, an attendance situation, or the like) of the user, arbitrary information (for example, a paper or the like) created by the user, or the like, registered by each educational institution (for example, a nursery school, a kindergarten, an elementary school, a junior high school, a high school, a university, a graduate school, a cram school, a preparatory school, a qualification school, or the like). Furthermore, the history information may include job history information (for example, an industry name, a company name, a job content, a job start date, a job end date, an official position, or the like), behavior history information (for example, a behavior content, a behavior date and time, a behavior place, a behavior frequency, or the like), or purchase history information (for example, an article name, an amount of money, a purchase date, or the like).

Furthermore, information regarding the ICs distributed to each user by the IC distributing unit 112b is also registered in the P2P database 122. Note that the information registered in the P2P database 122 is not limited to those described above. These pieces of information are registered in the P2P database 122 to secure authenticity. The various types of information registered in the P2P database 122 may be given an electronic signature using an encryption key or may be encrypted using an encryption key.

(P2P Database Program 122a)

The P2P database program 122a is a predetermined program that is provided in the P2P database 122 and is executed on the P2P database 122. By using the P2P database program 122a, for example, various types of processing other than a transaction of a virtual currency such as Bitcoin and the like is realized while maintaining consistency according to a predetermined rule. Furthermore, by providing the P2P database program 122a in the P2P database 122, a risk that the P2P database program will be illegally altered is reduced. The P2P database program 122a is a chain code in Hyperledger, but is not limited thereto. For example, the P2P database program 122a may refer to a smart contract.

The P2P database program 122a can realize general processing performed on the P2P database 122. For example, the P2P database program 122a can realize registration processing of the various types of information, acquisition processing of the various types of information, and the like, performed by accessing the P2P database 122.

Describing the registration processing of the various types of information more specifically, the P2P database program 122a functions as an acquiring unit that acquires the ICs owned by the users from the P2P database 122. Then, the P2P database program 122a can function as a consensus processing unit that performs consensus processing accompanied by the registration processing of the various types of information on the basis of the acquired ICs, and can collectively register all of some of the transactions stored in the transaction database 121 in the P2P database 122 by conducting consensus with the other node apparatuses.

Describing the consensus processing more specifically, the P2P database program 122a determines a difficulty level of the consensus processing performed by node apparatus (including the influence evaluating apparatus 100) corresponding to each user, on the basis of the ICs owned by each user. For example, the P2P database program 122a reduces a difficulty level of the consensus processing performed by a node apparatus corresponding to the user as the ICs owned by the user become more (in other words, as an influence of the user becomes strong). Therefore, as the influence of the user becomes strong, a probability that the node apparatus corresponding to the user will succeed in the consensus processing is increased. Therefore, an amount of calculation in the consensus processing is reduced, and the P2P database program 122a can thus reduce resources and energy required for the consensus processing as compared with the POW.

Note that the consensus processing may be realized by an arbitrary program other than the P2P database program 122a. Furthermore, the processing realized by the P2P database program 122a is not limited to those described above. A development language of the P2P database program 122a, the number of P2P database programs 122a provided in the P2P database 122, or the like, is not particularly limited.

(Communication Unit 130)

The communication unit 130 is a functional configuration that controls various communications with the external apparatus 200 and the other node apparatuses. For example, when the event occurs, the communication unit 130 receives the event information from the external apparatus 200. Furthermore, in a case where it is necessary to confirm the influence of the user in providing various services, the communication unit 130 receives acquisition request information of the IC information from the external apparatus 200, and transmits the IC information acquired from the P2P database 122 to the external apparatus 200. Note that information transmitted and received by the communication unit 130 and a case where the communication unit 130 performs communication are not limited to those described above.

The functional configuration example of the influence evaluating apparatus 100 has been described hereinabove. Note that the functional configuration described above with reference to FIG. 6 is only an example, and the functional configuration of the influence evaluating apparatus 100 is not limited to such an example. For example, the influence evaluating apparatus 100 may not necessarily include all of the configurations shown in FIG. 6. Furthermore, the functional configuration of the influence evaluating apparatus 100 can be flexibly modified according to specifications or operations.

2.4. Flow of Processing by Influence Evaluating Apparatus 100

The functional configuration example of the influence evaluating apparatus 100 has been described hereinabove. Next, a flow of processing by the influence evaluating apparatus 100 will be described.

(Flow of Processing from Detection of Event to Registration of ICs)

First, a flow of processing from detection of an event to registration of ICs will be described with reference to FIG. 7.

In step S1000, the event detecting unit 111 of the influence evaluating apparatus 100 detects an event. For example, in a case where the user provides the DN information or the ID information, the event detecting unit 111 detects the event by analyzing the event information provided from the external apparatus 200. In step S1004, the event detecting unit 111 generates a transaction on the basis of the event information, and provides the transaction to the transaction database 121. Therefore, the transaction is registered in the P2P database 122 after consensus processing.

In step S1008, the IC issuing unit 112*a* issues ICs on the basis of the event information. For example, the IC issuing unit 112*a* issues the ICs on the basis of a media to which the DN information or ID information is provided, users who have provided the DN information or the ID information, a type of the DN information or the ID information, a content of the DN information or the ID information, creativity of the DN information or the ID information, or the like. In step S1012, the IC distributing unit 112*b* distributes the ICs to each user on the basis of the event information. A flow of distribution processing of the ICs will be described later.

In step S1016, a transaction is generated on the basis of the ICs distributed by the IC distributing unit 112*b*, and is provided to the transaction database 121. Therefore, the transaction is registered in the P2P database 122 after consensus processing, and a series of processing ends.

(Flow of Distribution Processing of ICs)

Next, a flow of distribution processing (step S1012 in FIG. 7) of the ICs will be described with reference to FIG. 8. Note that a case where information provided by the user is a paper and ICs are distributed on the basis of the number of citations of each paper is illustrated by way of example in FIG. 8.

In step S1100, the IC distributing unit 112*b* grasps a citation relation of each paper on the basis of the main information and the support information included in the event information, and associates each paper in a chained manner. Thereafter, the IC distributing unit 112*b* grasps the number of citations of each paper on the basis of association between the papers in step S1104, and calculates the total number of citations in step S1108.

In step S1112, the IC distributing unit 112*b* grasps users to whom the ICs are to be distributed (in other words, users who have provided each paper) on the basis of the association between the papers. In step S1116, the IC distributing unit 112*b* calculates distribution ratios of the ICs for each user to whom the ICs are to be distributed on the basis of the calculated total number of citations. In step S1120, the IC distributing unit 112*b* distributes the ICs to each user on the basis of the calculated distribution ratios of the ICs, such that a series of processing ends.

(Flow of Consensus Processing)

Next, a flow of consensus processing will be described with reference to FIG. 9.

In step S1200, the P2P database program 122*a* acquires an IC owned by a user corresponding to its own apparatus (in other words, a user who uses its own apparatus) from the P2P database 122. In step S1204, the P2P database program 122*a* determines a difficulty level (content) of consensus processing on the basis of the acquired IC.

In step S1208, the P2P database program 122*a* executes the consensus processing. Note that a specific content of the consensus processing is not particularly limited. For example, the P2P database program 122*a* performs calculation for searching for a value satisfying a predetermined condition, or the like. In step S1212, the P2P database program 122*a* updates the P2P database 122 on the basis of a result of the consensus processing, and a series of processing ends. For example, the P2P database program 122*a* updates the P2P database 122 by registering information designated by a node apparatus that has succeeded in searching for the value satisfying the predetermined condition earliest in the P2P database 122.

Figure 7:
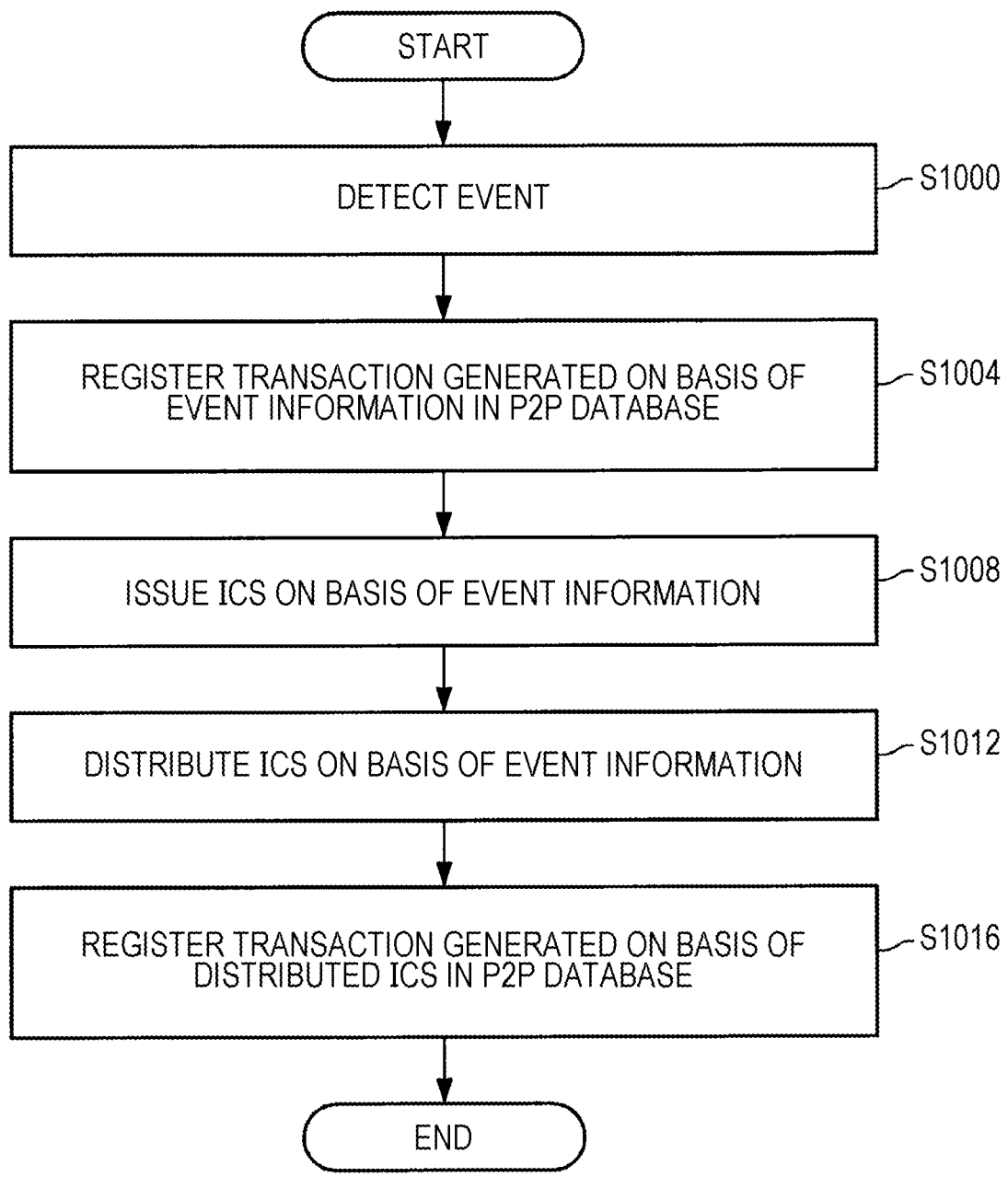
FIG. 7 is a flowchart showing an example of a flow from detection of an event to registration of ICs in a P2P database.
Figure 8:
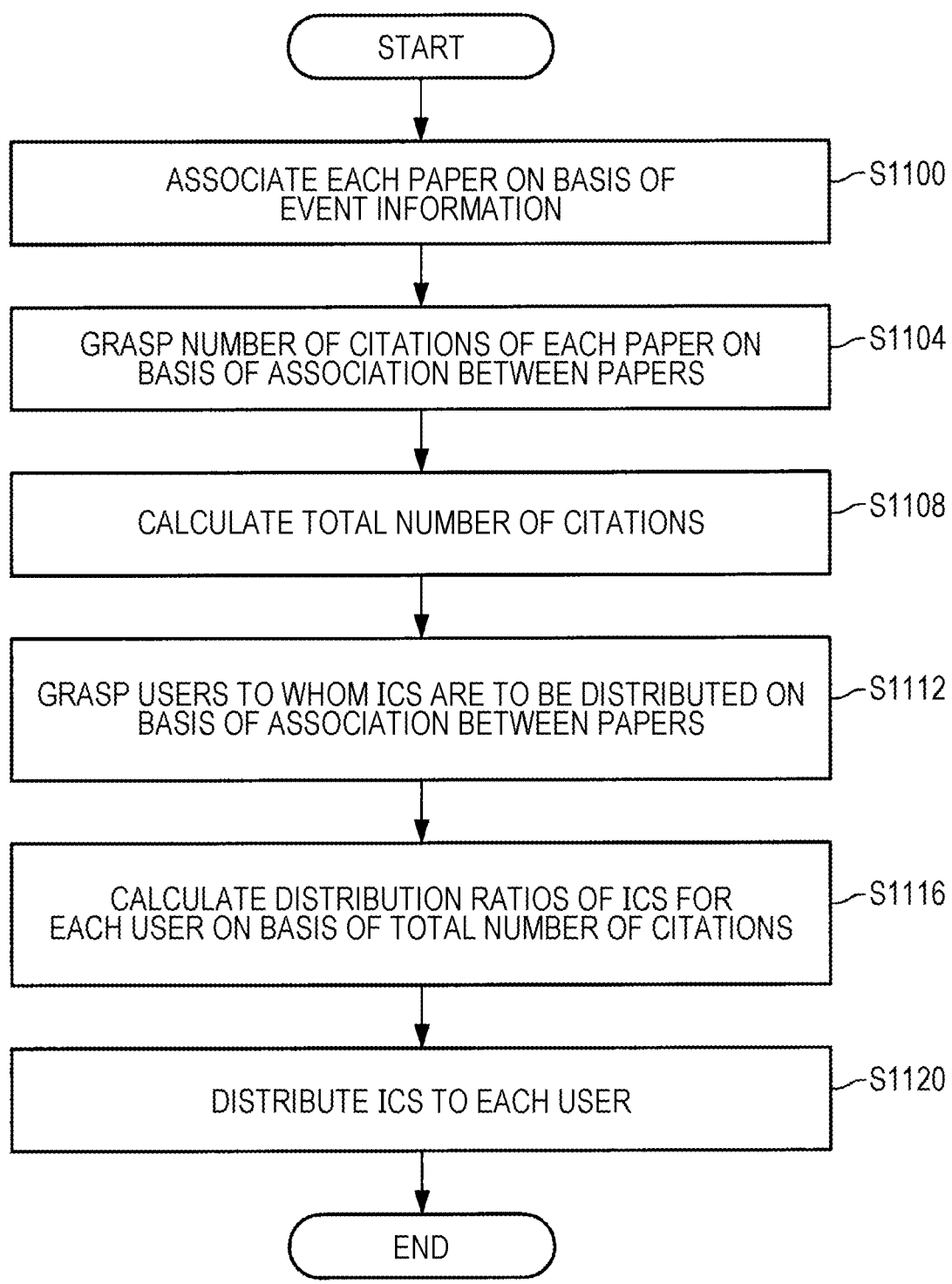
FIG. 8 is a flowchart showing an example of a flow of distribution processing of the ICs.
Figure 9:
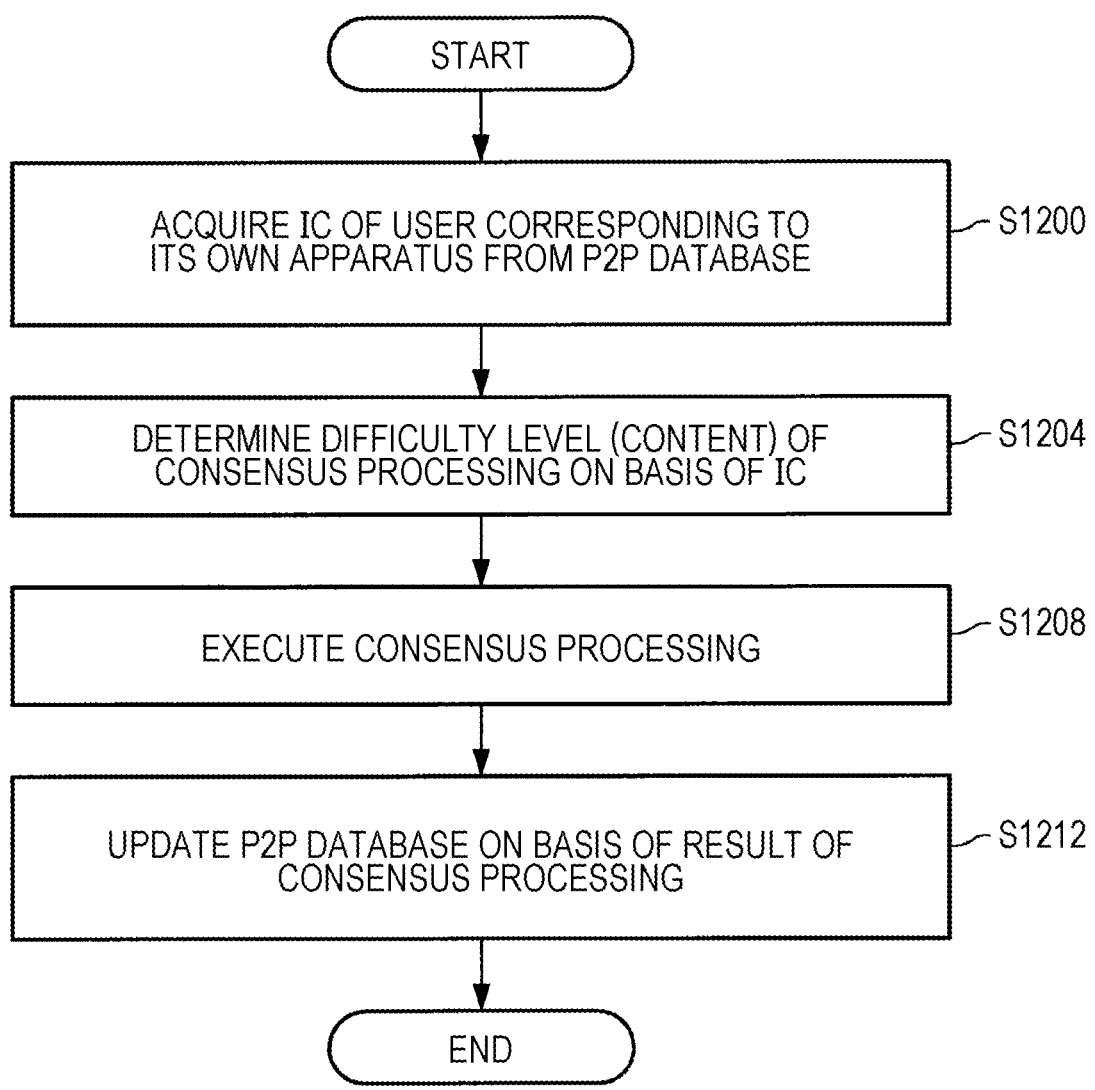
FIG. 9 is a flowchart showing an example of a flow of consensus processing.

Note that each step in flowcharts shown in FIGS. 7 to 9 does not necessarily need to be processed in time series in the order described. In other words, each step in the flowcharts may be processed in order different from the order described or may be processed in parallel.

2.5. Hardware Configuration Example of Influence Evaluating Apparatus 100

The flow of processing by the influence evaluating apparatus 100 has been described hereinabove. Next, a hardware configuration example of the influence evaluating apparatus 100 will be described with reference to FIG. 10.

Figure 10:
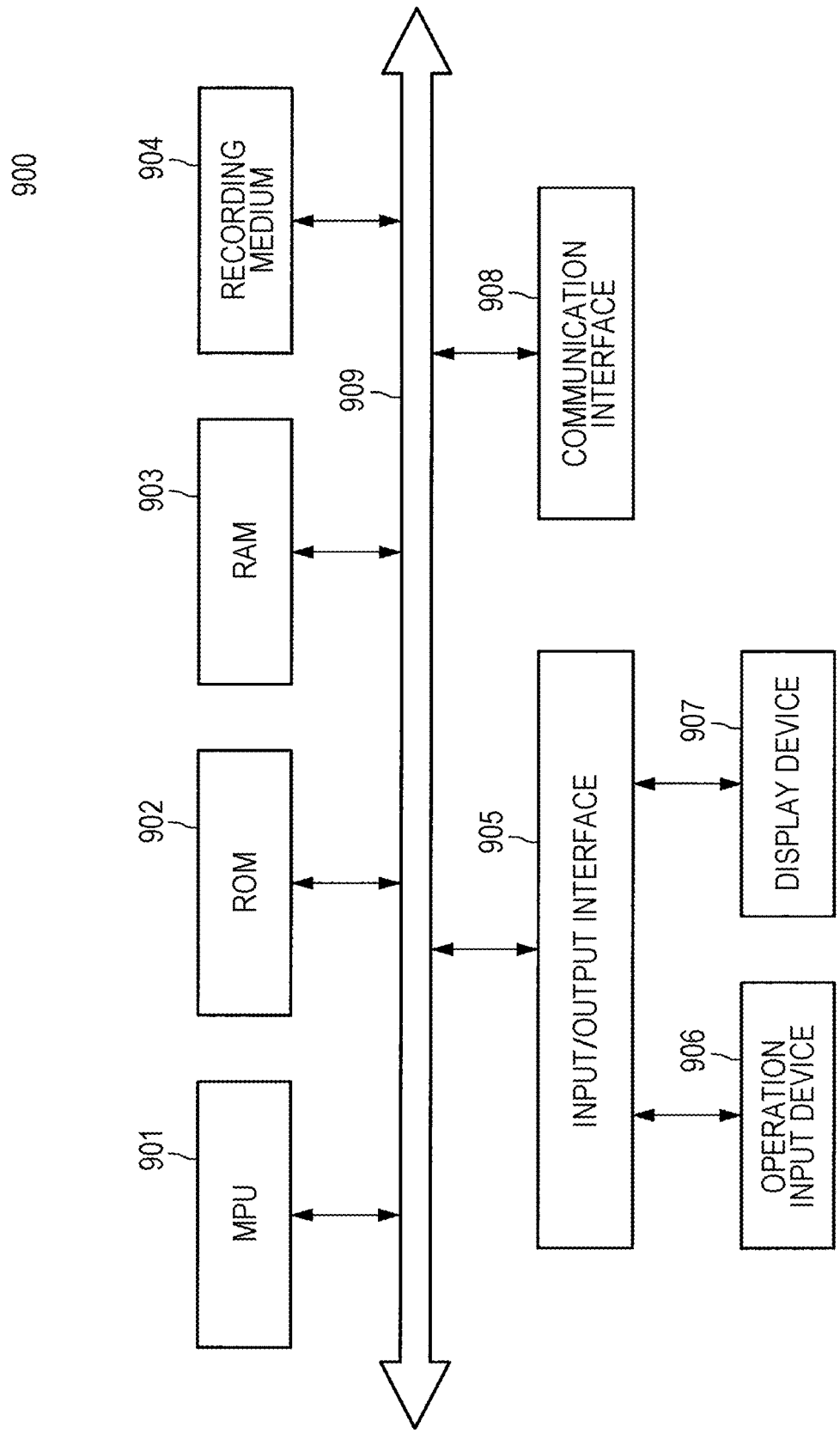
FIG. 10 is a block diagram showing a hardware configuration example of an information processing apparatus 900 that realizes the influence evaluating apparatus 100 according to the present embodiment.

FIG. 10 is a block diagram showing a hardware configuration example of the influence evaluating apparatus 100. The influence evaluating apparatus 100 can be embodied by an information processing apparatus 900 shown in FIG. 10.

The information processing apparatus 900 includes, for example, an MPU 901, a ROM 902, a RAM 903, a recording medium 904, an input/output interface 905, an operation input device 906, a display device 907, and a communication interface 908. Furthermore, the information processing apparatus 900 connects each component by a bus 909 as a data transmission path, for example.

The MPU 901 includes, for example, one or two or more processors, various processing circuits or the like including an arithmetic circuit such as an MPU or the like, and functions as the control unit 110 of the influence evaluating apparatus 100. Note that the control unit 110 of the influence evaluating apparatus 100 may include a dedicated (or general-purpose) circuit (for example, a processor or the like separate from the MPU 901) capable of realizing the various types of processing described above.

The ROM 902 stores control data or the like such as programs, operation parameters, or the like used by the MPU 901. The RAM 903 temporarily stores, for example, programs or the like executed by the MPU 901.

The recording medium 904 functions as the storage unit 120 of the influence evaluating apparatus 100, and stores various data such as, for example, various history information including the event information, the IC information, or the like. Here, examples of the recording medium 904 can include a magnetic recording medium such as a hard disk or the like and a non-volatile memory such as a flash memory or the like. Furthermore, the recording medium 904 may be detachable from the information processing apparatus 900.

The input/output interface 905 connects, for example, the operation input device 906 or the display device 907. Here, examples of the input/output interface 905 can include a universal serial bus (USB) terminal, a digital visual interface (DVI) terminal, a high-definition multimedia interface (HDMI) (registered trademark) terminal, various processing circuits, and the like.

Furthermore, the operation input device 906 is provided, for example, on the information processing apparatus 900, and is connected to the input/output interface 905 inside the information processing apparatus 900. Examples of the operation input device 906 can include a keyboard, a mouse, a keypad, a touch panel, a microphone, an operation button, a rotary selector such as a direction key, a jog dial, or the like, or a combination thereof.

Furthermore, the display device 907 is provided, for example, on the information processing apparatus 900, and is connected to the input/output interface 905 inside the information processing apparatus 900. Examples of the display device 907 can include a liquid crystal display, an organic electro-luminescence (EL) display, or the like.

Note that it goes without saying that the input/output interface 905 can also be connected to an external device such as an external operation input device, an external display device, or the like of the information processing apparatus 900. Furthermore, the display device 907 may be a device capable of display and user operation, such as, for example, a touch panel or the like.

The communication interface 908 is a communication means that is included in the information processing apparatus 900, and functions as the communication unit 130 of the influence evaluating apparatus 100. Furthermore, the communication interface 908 may have a function of performing wireless or wired communication with an arbitrary external apparatus such as, for example, a server or the like through an arbitrary network (or directly). Here, examples of the communication interface 908 can include a communication antenna and a radio frequency (RF) circuit (wireless communication), an IEEE802.15.1 port and a transmission/reception circuit (wireless communication), an IEEE802.11 port and a transmission/reception circuit (wireless communication), a local area network (LAN) terminal and a transmission/reception circuit (wired communication), or the like.

Note that the hardware configuration of the information processing apparatus 900 is not limited to the configuration shown in FIG. 10. For example, the information processing apparatus 900 may not include the communication interface 908 in a case where the information processing apparatus 900 performs communication through an external communication device to which the information processing apparatus 900 is connected. Furthermore, the communication interface 908 may be a configuration that can perform communication in a plurality of communication manners Furthermore, the information processing apparatus 900 may not include, for example, the operation input device 906, the display device 907, or the like. Furthermore, for example, some or all of the configurations shown in FIG. 10 may be realized by one or more integrated circuits (ICs).

2.6. Application of IC

The hardware configuration example of the influence evaluating apparatus 100 has been described hereinabove. Next, an application of the ICs distributed to each user will be described.

As described above, the ICs distributed to each user can be used for various applications. More specifically, the ICs may be used as a security of credit of a user who owns the ICs or as another arbitrary decision material. For example, in a loan from a financial institution, a credit transaction, an application for a grant, an application for a scholarship, another arbitrary contract, or the like, the ICs may be used as a security of credit of the user. Furthermore, the ICs may be used as a decision material at the time of recruitment, assignment to a project, certification of an expert, or the like.

Furthermore, in an arbitrary service, a service content, price, or the like may be determined on the basis of the ICs owned by each user. For example, as the number of ICs owned by the user increases, provision of more complete services, discount, or the like may be performed as a benefit.

Furthermore, the ICs may be used as a compensation for provision of a product or a service like a virtual currency. In other words, the ICs may be transferred from a user to whom the product or the like has been provided to a user who has provided the product or the like by using the ICs as the compensation for the provision of the product or the service. Furthermore, the ICs may be exchanged for an arbitrary currency.

Here, the user may distinguish and own ICs that do not decrease even when being used and ICs that decrease when being used. For example, the ICs that does not decrease even when being used may be used as the security of the credit of the user, or the like, and the ICs that decreases when being used may be used as the compensation for the provision of the product or the service, or the like. Note that the application of the ICs is not limited to those described above.

3. Modification

The application of the ICs distributed to each user has been described hereinabove. Next, a modification of the present disclosure will be described.

Hereinabove, the IC processing unit 112 (including the IC issuing unit 112*a*, the IC distributing unit 112*b*, and the influence evaluating unit 112*c*) of the influence evaluating apparatus 100 has evaluated the influences of each user by issuing the ICs and distributing the ICs to each user. Here, in a modification, the P2P database program 122*a* may evaluate the influences of each user by performing these processing. In other words, the P2P database program 122*a* may function as a calculating unit that calculates the ICs of each user.

More specifically, the P2P database program 122*a* may acquire the event information registered in the P2P database 122, issue the ICs by analyzing the event information, and distribute the issued ICs to each user. Then, in a case where is necessary to confirm the influence of the user in providing various services, the P2P database program 122*a* may acquire the IC information from the P2P database 122 on the basis of provision request information received from the external apparatus 200, and provide the IC information to the external apparatus 200.

According to the modification, each processing described above can be automated by the P2P database program 122a. Furthermore, since the P2P database program 122a has tamper resistance, information (for example, the issued ICs, the ICs distributed to each user, it is possible to prevent the IC information acquired from the P2P database 122, and the like) output by a series of processing from being tampered with.

Furthermore, the P2P database program 122a may recalculate the ICs of each user registered in the P2P database 122. More specifically, a decision criterion of the influence usually changes over time. Therefore, the P2P database program 122a may update each parameter used at the time of issuing or distributing the ICs at any time, and recalculate the ICs of each user on the basis of the updated parameters. Then, the P2P database program 122a generates a transaction on the basis of the recalculated ICs, and registers the transaction in the P2P database 122. Therefore, the P2P database program 122a can evaluate the influences of each user on the basis of the decision criterion of the influence that changes over time. Note that the recalculation processing of the ICs of each user may be realized by an arbitrary program other than the P2P database program 122a.

4. Summary

As described above, in a case where the second user performs some event using the arbitrary information provided by the first user, which is the target to be evaluated, the influence evaluating apparatus 100 considers that the first user has affected the event, and evaluates the influence of the first user.

Therefore, the influence evaluating apparatus 100 can evaluate the influences of each user with higher accuracy. For example, the influence evaluating apparatus 100 can evaluate the influences of each user in consideration of behavior (example, sharing, evaluation, or disclosure on a blog of information in social media, development of an open source code, or the like) of each user online. Furthermore, even in a case where each user behaves (for example, purchases a product or the like, publishes a book, or the like) offline, the influence evaluating apparatus 100 can evaluate the influences of each user in consideration of the behavior of each user offline if it can acquire information regarding an event that has occurred on the basis of this behavior.

Then, the influence evaluating apparatus 100 performs consensus processing at the time of updating the P2P database 122 on the basis of the ICs indicating the influences of each user. More specifically, the influence evaluating apparatus 100 determines a difficulty level of the consensus processing on the basis of the ICs owned by each user (for example, lowers the difficulty level of the consensus processing as the influence of the user becomes strong, or the like). Therefore, the influence evaluating apparatus 100 can reduce resources and energy required for the consensus processing while securing tamper resistance of the P2P database 122.

Hereinabove, the preferred embodiments of the present disclosure have been described in detail with reference to the accompanying drawings, but the technical scope of the present disclosure is not limited to such embodiments. It will be apparent to those skilled in the art of the present disclosure that various modifications or alterations can be conceived within the scope of the technical idea described in the claims, and it is naturally understood that these modifications or alterations also fall within the technical scope of the present disclosure.

Furthermore, the effects described in the present specification are only illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

An information processing apparatus including:

an acquiring unit that acquires a value indicating an influence of a user; and a consensus processing unit that performs consensus processing regarding update of a P2P database on the basis of the value indicating the influence.

(2)

The information processing apparatus according to the above (1), in which the consensus processing unit determines a difficulty level of the consensus processing on the basis of the value indicating the influence.

(3)

The information processing apparatus according to the above (2), in which the consensus processing unit lowers the difficulty level of the consensus processing by the information processing apparatus corresponding to the user as the influence of the user becomes strong.

(4)

The information processing apparatus according to any one of the above (1) to (3), further including a calculating unit that calculates the value indicating the influence of the user on the basis of an event performed by another user using arbitrary information provided by the user.

(5)

The information processing apparatus according to the above (4), in which the event is that another piece of arbitrary information is provided using the arbitrary information.

(6)

The information processing apparatus according to the above (5), in which the calculating unit associates a plurality of the arbitrary information in a chained manner by the event.

(7)

The information processing apparatus according to the above (6), in which the calculating unit calculates a value indicating an influence of a user who has provided the arbitrary information on the basis of an event related to another piece of arbitrary information associated with a subsequent stage of the arbitrary information.

(8)

The information processing apparatus according to the above (7), in which the calculating unit outputs a value corresponding to the event related to the another piece of arbitrary information associated with the subsequent stage of the arbitrary information, and calculates the value indicating the influence of the user by distribution of the value.

(9)

The information processing apparatus according to the above (8), in which the calculating unit calculates the value indicating the influence of the user by accumulation of the distribution.

(10)

The information processing apparatus according to any one of the above (4) to (9), in which the value indicating the influence of the user or history information regarding the event is registered in the P2P database.

(11)

The information processing apparatus according to the above (10), in which the history information regarding the event includes learning history information, job history information, behavior history information, or purchase history information.

(12)

The information processing apparatus according to any one of the above (4) to (11), in which the calculating unit calculates the value indicating the influence of the user using a predetermined program provided in the P2P database and executed on the P2P database.

(13)

The information processing apparatus according to any one of the above (4) to (12), in which the arbitrary information is online information provided on social media, a paper publishing site, a blog site, or another arbitrary website.

(14)

The information processing apparatus according to any one of the above (1) to (13), in which the P2P database is blockchain data.

(15)

An information processing method executed by a computer, including:

acquiring a value indicating an influence of a user; and performing consensus processing regarding update of a P2P database on the basis of the value indicating the influence.

(16)

A program for causing a computer to realize:

acquiring a value indicating an influence of a user; and performing consensus processing regarding update of a P2P database on the basis of the value indicating the influence.

REFERENCE SIGNS LIST

100 Influence evaluating apparatus
110 Control unit
111 Event detecting unit
112 IC processing unit
112*a* IC issuing unit
112*b* IC distributing unit
112*c* Influence evaluating unit
120 Storage unit
121 Transaction database
122 P2P database
122*a* P2P database program
130 Communication unit
200 External apparatus
300 Network
400 P2P network

The invention claimed is:

1. An information processing apparatus comprising:
   circuitry configured to:
   acquire a value indicating an influence of a user;
   perform consensus processing regarding update of a P2P database on a basis of the value indicating the influence; and
   update the P2P database on a basis of a result of the consensus processing.

2. The information processing apparatus according to claim 1, wherein
   the circuitry is configured to determine a difficulty level of the consensus processing on a basis of the value indicating the influence.

3. The information processing apparatus according to claim 2, wherein
   the circuitry is configured to lower the difficulty level of the consensus processing by the information processing apparatus corresponding to the user as the influence of the user becomes strong.

4. The information processing apparatus according to claim 1, wherein
   the circuitry is configured to calculate the value indicating the influence of the user on a basis of an event performed by another user using information provided by the user.

5. The information processing apparatus according to claim 4, wherein
   the event is that another piece of information is provided using the information.

6. The information processing apparatus according to claim 5, wherein
   the circuitry is configured to associate a plurality of pieces of the information in a chained manner by the event.

7. The information processing apparatus according to claim 6, wherein
   the circuitry is configured to calculate a value indicating an influence of a user who has provided the information on a basis of an event related to another piece of information associated with a subsequent stage of the information.

8. The information processing apparatus according to claim 7, wherein
   the circuitry is configured to output a value corresponding to the event related to the another piece of information associated with the subsequent stage of the information, and to calculate the value indicating the influence of the user by distribution of the value.

9. The information processing apparatus according to claim 8, wherein
   the circuitry is configured to calculate the value indicating the influence of the user by accumulation of the distribution.

10. The information processing apparatus according to claim 4, wherein
    the value indicating the influence of the user or history information regarding the event is registered in the P2P database.

11. The information processing apparatus according to claim 10, wherein
    the history information regarding the event includes learning history information, job history information, behavior history information, or purchase history information.

12. The information processing apparatus according to claim 4, wherein
    the circuitry is configured to calculate the value indicating the influence of the user using a predetermined program provided in the P2P database and executed on the P2P database.

13. The information processing apparatus according to claim 4, wherein the information is online information provided on social media, a paper publishing site, a blog site, or another website.

14. The information processing apparatus according to claim 1, wherein the P2P database is blockchain data.

15. An information processing method executed by a computer, comprising:

acquiring a value indicating an influence of a user;

performing consensus processing regarding update of a P2P database on a basis of the value indicating the influence; and updating the P2P database on a basis of a result of the consensus processing.

16. A non-transitory computer-readable storage medium encoded with executable instructions that, when executed by at least one processor, cause the at least one processor to perform:

acquiring a value indicating an influence of a user;

performing consensus processing regarding update of a P2P database on a basis of the value indicating the influence; and updating the P2P database on a basis of a result of the consensus processing.

* * * * *